(12) United States Patent
Olschewski

(10) Patent No.: US 7,394,482 B2
(45) Date of Patent: Jul. 1, 2008

(54) MICROSCOPE SYSTEM AND METHOD FOR THE ANALYSIS AND EVALUATION OF MULTIPLE COLORINGS OF A MICROSCOPIC SPECIMEN

(75) Inventor: Frank Olschewski, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1001 days.

(21) Appl. No.: 10/694,109

(22) Filed: Oct. 27, 2003

(65) Prior Publication Data

US 2004/0098205 A1  May 20, 2004

(30) Foreign Application Priority Data

Oct. 28, 2002  (DE) ................ 102 50 100

(51) Int. Cl.
  H04N 7/18  (2006.01)
  H04N 9/47  (2006.01)
(52) U.S. Cl. ............................................ 348/79
(58) Field of Classification Search ........... 348/79–80
  See application file for complete search history.

(56) References Cited

U.S. PATENT DOCUMENTS

| | | | | |
|---|---|---|---|---|
| 6,300,639 | B1 * | 10/2001 | Wiederhoeft | 250/458.1 |
| 6,333,501 | B1 * | 12/2001 | Labrenz | 250/341.5 |
| 7,006,675 | B2 * | 2/2006 | Olschewski | 382/128 |
| 7,033,781 | B1 * | 4/2006 | Short | 435/69.1 |
| 2002/0085763 | A1 | 7/2002 | Olschewski | 382/224 |
| 2006/0041384 | A1 * | 2/2006 | Kermani et al. | 702/19 |

FOREIGN PATENT DOCUMENTS

DE  100 65 783 A1  7/2002

OTHER PUBLICATIONS

Haykin, Simon, "*Self-Organizing Systems II: Competitive Learning*", Ch. 10, pp. 397-443, Neural Networks A Comprehensive Foundation.
Luo, Fa-Long and Unbehauen, Rolf, "*Neural Networks for Vector Quantization*", Sec. 9.6, pp. 358-362, Applied Neural Networks for Signal Processing.
Ripley, B.D., "*Learning Vector Quantization*", Sec. 6.3, pp. 201-207; "*Clustering Algorithms*", Sec. 9.3, pp. 311-322; "*Self-Organizing Maps*", Sec. 9.4, pp. 322-326, Pattern Recognition and Neural Networks.
Moon, Todd K. and Stirling, Wynn C., "*Other Iterative Algorithms*", Ch. 16, pp. 695-706, Mathematical Methods and Algorithms for Signal Processing.
Fritzke, Bernd, "Vector-based Neural Networks," booklet (1998).

* cited by examiner

*Primary Examiner*—Nhon T Diep
(74) *Attorney, Agent, or Firm*—Houston Eliseeva LLP

(57) ABSTRACT

A microscope system and a method that record spectra (60a, 61a, 62a, 63a, and 66a) of the dyes present in the specimen (15) using an SP module (20) are disclosed. A transformation of the data of the ascertained spectra, and of the dye spectra (60b, 61b, 62b, 63b, and 66b) stored in a database, is performed. The spectra are entered into a correspondingly into a divided transformation space. Allocation of the dye spectra (60b, 61b, 62b, 63b, and 66b) to the measured spectra (60a, 61a, 62a, 63a, and 66a) is accomplished by way of a comparison in the transformation space.

6 Claims, 7 Drawing Sheets

MICROSCOPE SYSTEM AND METHOD FOR THE ANALYSIS AND EVALUATION OF MULTIPLE COLORINGS OF A MICROSCOPIC SPECIMEN

RELATED APPLICATIONS

This application claims priority of the German patent application 102 50 100.9 which is incorporated by reference herein.

FIELD OF THE INVENTION

The invention concerns a microscope system for the analysis and evaluation of multiple colorings of a microscopic specimen.

The invention further concerns a method for the analysis and evaluation of multiple colorings of a microscopic specimen.

The invention additionally concerns a method for adjusting a microscope that is used for the recording of multiple colorings of a microscopic specimen.

BACKGROUND OF THE INVENTION

DE 100 65 783 A1 discloses a technique for sensing correlations in microscopic applications.

SUMMARY OF THE INVENTION

It is the object of the invention to create a microscope system with which the fluorescence spectra of multiple dyes present in a sample can reliably be separated.

This object is achieved by means of a microscope system for the analysis and evaluation of multiple colorings in a microscopic specimen, comprising: a scanning microscope that defines an illuminating light beam and a detected light beam; an SP module that is arranged in the detected light beam in front of at least one detector; and a computer system with a memory, wherein a database is provided in which discrete dye spectra are stored; the computer system encompasses a software program that performs a transformation of the data of the ascertained spectra and a transformation of the dye spectra stored in the database; and the software program allocates the transformed dye spectra to the measured spectra, in which context a comparison can be performed.

A further object of the invention is to create a method with which the fluorescence spectra of multiple dyes present in a sample can reliably be separated.

The aforesaid object is achieved by means of a method for the analysis and evaluation of multiple colorings in a microscopic specimen using a scanning microscope, comprising the following steps:

a) recording spectra of dyes present in the specimen using an SP module, and ascertaining the electrical signals representing the spectra;

b) performing a transformation of the data of the ascertained spectra, performing the transformation of the dye spectra stored in a database;

c) dividing the transformation space into regions, each of which is allocated to a certain dye; and d) allocating the dye spectra to the measured spectra by way of a comparison in the transformation space.

The invention has the advantage that an automatic allocation of measured spectra to discrete dye spectra is possible. Measured discretized dye spectra are stored, as a reference data set, in a database. After a transformation of the data of recorded spectra and the discrete reference spectra stored in the database, the software running on the computer system makes a comparison. The software thus allocates the transformed reference spectra to the measured dye spectra.

The method for the analysis and evaluation of multiple colorings in a microscopic specimen using a scanning microscope is also advantageous. Firstly, spectra of the dyes present in the specimen are recorded using an SP module. From the recorded spectra, representative electrical and (after discretization) digital signals are ascertained. Performance of a coordinate transformation of the data of the ascertained spectra, and performance of a transformation of the discrete dye spectra stored in the data base, are performed in the software of the computer system. The feature space resulting after the transformation (a hyperspace having a very large number of dimensions) is divided into regions, each of which is allocated to a specific dye. Lastly, the discrete reference dye spectra transformed in the feature space are allocated to the measured and transformed spectra.

Further advantageous embodiments of the invention are evident from the dependent claims.

BRIEF DESCRIPTION OF THE DRAWINGS

The subject matter of the invention is depicted schematically in the drawings and will be described below with reference to the Figures, in which.

DEFINITION OF TERMS

Measured Spectra:

Spectra that are measured with the microscope system. These spectra can represent mixed states of dyes.

Reference Dye Spectra:

These are dye spectra of the pure dyes present in the specimen; no mixed states at all occur. In the feature space presentation described in detail below, these constitute the vertices of the polygon in the hyperspace.

Discretized Dye Spectra:

Spectra that, after measurement and digitization in a computer, are present in discretized and digital form and can be stored in a database. By means of a transformation performed by algorithm by the computer system, they can be transferred without information loss into a high-dimension feature space (hyperspace).

Specimen:

The specimen is also referred to in the description hereinafter as a "sample," and as a rule is biological material.

DETAILED DESCRIPTION OF THE INVENTION

Figure 1:
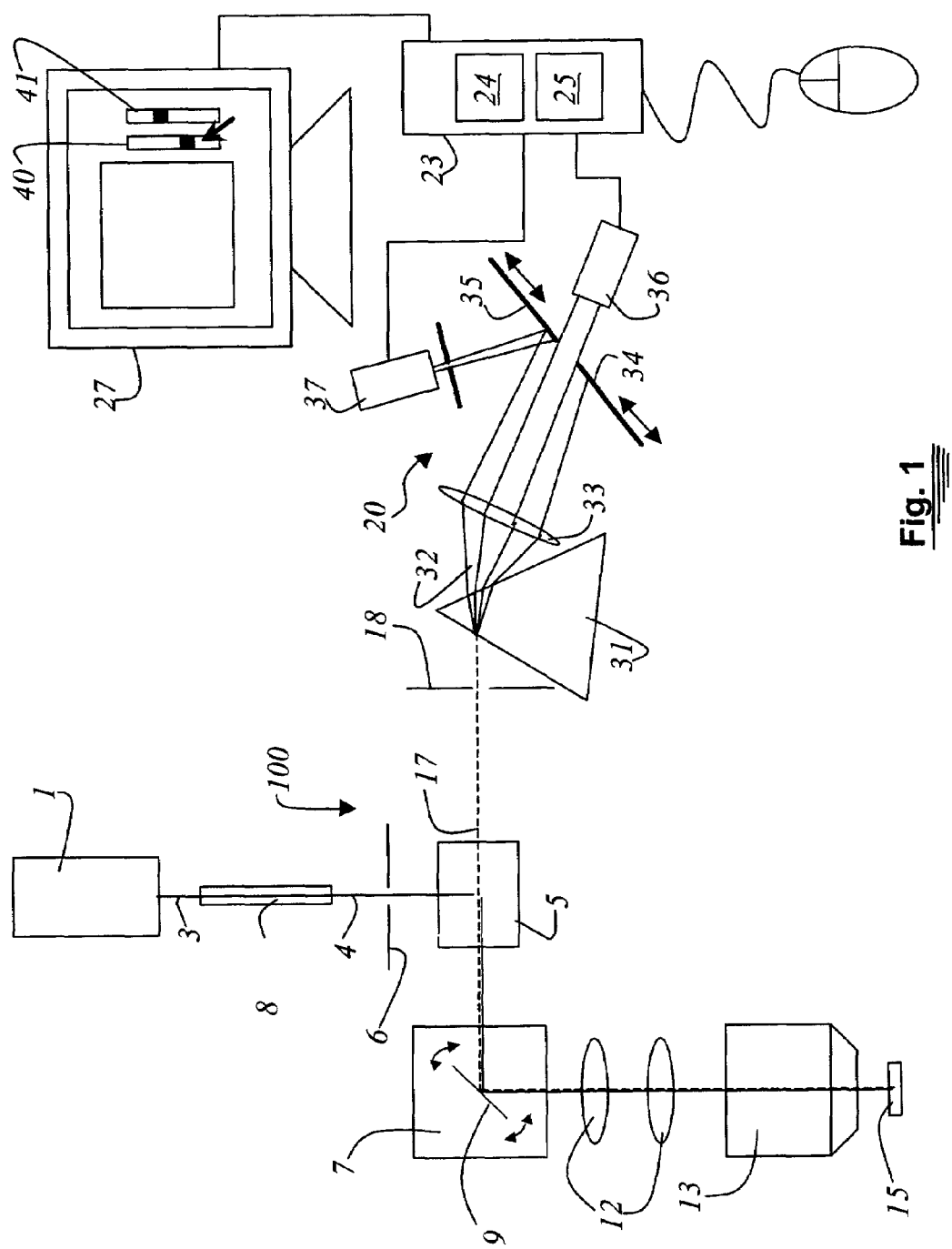
FIG. 1 schematically depicts a scanning microscope, the detectors being preceded by an SP module.

FIG. 1 schematically shows an exemplary embodiment of a confocal scanning microscope 100. This is not intended, however, to be construed as a limitation of the invention. Illuminating light beam 3 coming from at least one illumination system 1 is directed by a beam splitter or a suitable deflection means 5 to a scanning module 7. Before illuminating light beam 3 strikes deflection means 5, it passes through an illumination pinhole 6. Scanning module 7 encompasses a gimbal-mounted scanning mirror 9 that guides illuminating light beam 3, through a scanning optical system 12 and a microscope optical system 13, over or through a specimen 15. Illumination system 1 can be configured in such a way that it generates white light from the light of a laser 10. A microstructured element 8 or a tapered glass fiber is provided for this purpose. For biological specimens 15 (preparations) or transparent specimens, illuminating light beam 3 can also be guided through specimen 15. For these purposes, non-luminous specimens are, if applicable, prepared with a suitable dye and often also with several dyes (not depicted, since established existing art). The dyes present in specimen 15 are excited by illuminating light beam 3 and emit light in a characteristic region of the spectrum peculiar to them. This light proceeding from specimen 15 defines a detected light beam 17. The latter travels through microscope optical system 13 and scanning optical system 12 and via scanning module 7 to deflection means 5, passes through the latter, and travels via a detection pinhole 18 onto at least one detector 36, 37 embodied respectively as a photomultiplier. It is evident to one skilled in the art that other detection components, for example diodes, diode arrays, photomultiplier arrays, CCD chips, or CMOS image sensors, can also be used. Detected light beam 17 proceeding from or defined by specimen 15 is depicted in FIG. 1 as a dashed line. In detectors 36, 37, electrical detected signals proportional to the power level of the light proceeding from specimen 15 are generated. Since, as already mentioned above, light of not only one wavelength is emitted from specimen 15, it is useful to provide an SP module 20 in front of the at least one detector 36, 37. The data generated by the at least one detector 36, 37 are delivered to a computer system 23. At least one peripheral 27 is associated with computer system 23. Peripheral 27 can be, for example, a display on which the user receives instructions for setting scanning microscope 100, or can view the current setup and also the image data in graphical form. Also associated with computer system 23 is an input means 28 that comprises, for example, a keyboard, an adjusting apparatus for the components of the microscope system, and/or a mouse 30. A memory 24, in which a database or an equivalent data management device for managing spectra is installed, is likewise associated with computer system 23. Additionally implemented in computer system 23 is a software program 25 with which the appropriate calculations for the method according to the invention can be carried out. Setting elements 40, 41 for image recording are additionally depicted on display 27. In the embodiment shown here, setting elements 40, 41 are depicted as sliders. Any other embodiment lies within the specialized ability of one skilled in the art.

Detected light beam 17 is spatially spectrally divided using a prism 31. A further possibility for spectral division is the use of a reflection or transmission grating. The spectrally divided light fan 32 is focused with focusing optical system 33 and then strikes a mirror stop arrangement 34, 35. Mirror stop arrangement 34, 35; the means for spectral spatial division; focusing optical system 33; and detectors 36 and 37 are together referred to as SP module 20 (or the multi-band detector).

Figure 2:
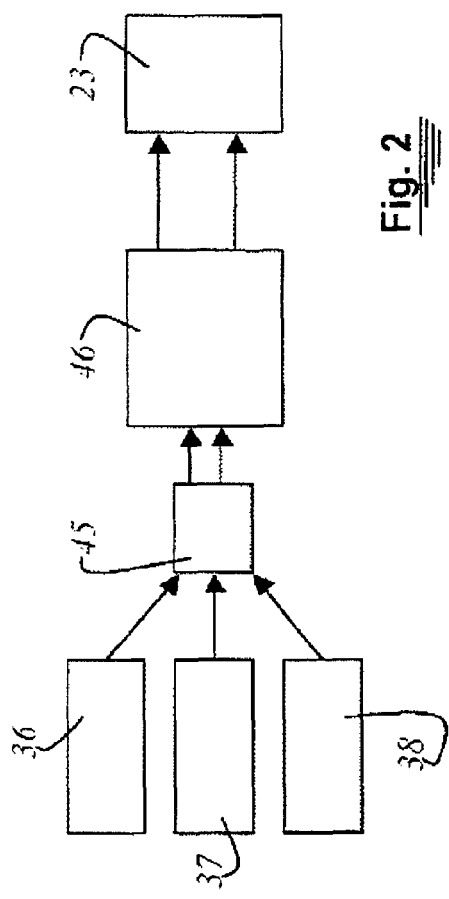
FIG. 2 is a schematic description of the handling and processing of the measured values (intensity) determined by the multiple detectors.

FIG. 2 describes the handling and processing of the measured values (intensity) obtained from the multiple detectors 36, 37, and 38. Only two detectors 36 and 37 are depicted in FIG. 1, but it is self-evident that the number of detectors can also be greater than two. In FIG. 2. three detectors are shown merely by way of example. It is, however, self-evident that the number can also be greater. In this exemplary embodiment, detectors 36, 37, and 38 are depicted as photomultiplier tubes (PMTs). For the evaluation of local correlations, the measured values from the PMTs are delivered to an electronic device 45 that performs the corresponding evaluation as described below. Downstream from device 45 is a means 46 for selecting a subset from the plurality of recorded spectra. The selected spectra arc delivered to computer system 23, Computer system 23 is connected, for example, to SR module 20. On the basis of the transmitted spectral representations. SP module 20 ascertains the crosstalk and performs an automatic adjustment with which the crosstalk of the individual detection channels is minimized, or visualizes them using the method described below.

Figure 3:
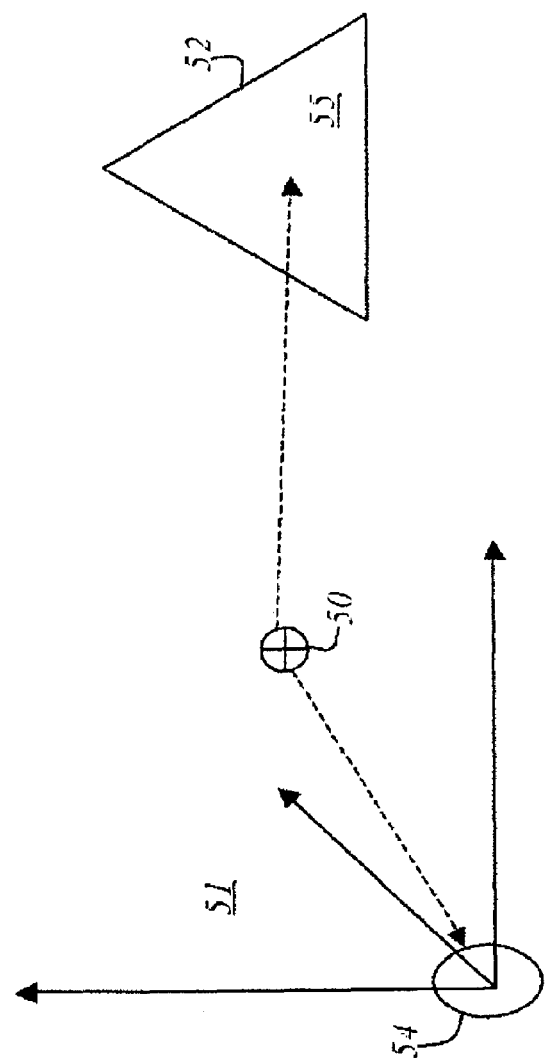
FIG. 3 is a graphic depiction of the spectral measured values in the intensity space and, parallel thereto, in the projection space.

FIG. 3 is a graphical depiction of at least one measured value 50 in intensity space 51 and, parallel thereto, in projection space 52. As a rule, multiple dyes are present in one specimen so that certain regions of a specimen can thereby be labeled. Upon detection, it is important to allocate the recorded signals unequivocally to the dyes that are present. Upon measurement, a mixture of dyes is obtained. The mixture of dyes is, mathematically, a linear problem. Each dye can be represented as a vector $s_i$ having components from spectral bands. The intensity vector I measured by the detectors can then be explained as $$I = \sum_i a_i s_i + n,$$

where n is the vector background component or noise. In the case described in FIG. 3, there are three dyes and arbitrary spectral scans are being considered (something between a lambda scan and three-channel scan); measured value 50 (intensity value) therefore lies in the space of vector I within a pyramid. When measured value I 50 is projected onto the unit sphere of the intensity space, point clouds are obtained on the surface of that unit sphere 54. For the three-channel scan, this is relatively simple. The enclosing figure is always a triangle, and the vertices correspond to the reference spectra corresponding to the pure dyes. This can be visualized on the PC monitor in extremely simple fashion by drawing a triangle and placing the corresponding point clouds in it. The user can evaluate the overall situation relatively quickly using his or her standard visual capabilities, and implement the simple heuristic of "bringing the point clouds into the corners" by adjusting the controls of the confocal microscope. For measurements using more than three dyes, it is first necessary to calculate a dimensional reduction in order to obtain an appropriate visual depiction, rectangles, pentangles or unusual polygons being generated. These visualizations do not, however, have the pragmatic nature of the three-dye case, and rapidly become too complex. For practical purposes, however, three dyes are in most cases sufficient. Triangle 55 (FIG. 4) of the projection space can be employed very effectively for visualization. For this procedure, the channels of the individual colors are allocated to corners 56 of triangle 55. The modulation or separation of the individual channels or dyes can be recognized based on the location of the point clouds with respect to the corners of the triangle. The goal is to end up in the corners of the triangle when measuring. An incorrect setting of scanning microscope 100 and/or of SP module 20 will create some departure from that situation; an online calculation during the scan provides the user of the system with feedback for arriving at the ideal setting.

Figure 4:
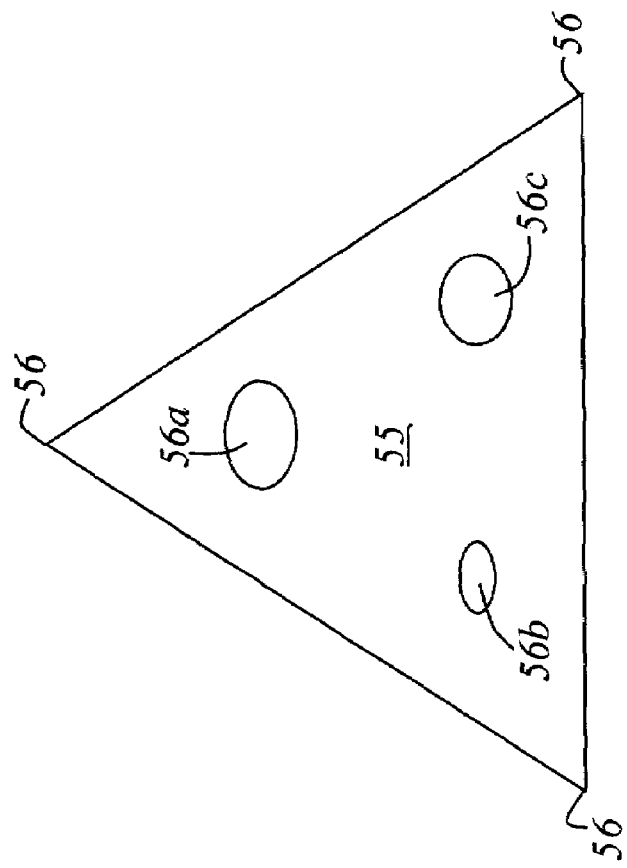
FIG. 4 shows a projection of the measured values onto a hyperplane/hypercube.

FIG. 4 schematically depicts the point clouds within triangle 55 that is presented visually to the user on display 27. When the sample is observed using scanning microscope 100, a mixture of the dyes present in the sample is obtained in each pixel. As already mentioned above, each dye can be represented as a vector si having components in the spectral bands. The measured intensity is then explained as $$I = \sum_i a_i s_i + n = Ma,$$

where n is the background component or noise, M is a mixed matrix, and the a's are the weighting of the spectral components. When the sample is observed using a scanning microscope to which an SP module is connected, and when spectral scans are recorded, I is then a multi-dimensional vector having P dimensions. In standard fluorescence microscopy it is often the case that N=P; with spectral scans, P>N and the working space is a hyperspace. In this hyperspace, the individual dye weightings are present as intensity lobes. The vector norm is calculated based on a metric, and on the basis of the value a decision is made as to whether autofluorescence and background, or a useful signal, is present (quick value check). The test decides whether or not the data vector constitutes a useful signal and is subject to further processing. The Euclidean norm is an obvious choice, since it is physically comparable to signal energies. A generalization to other metrics of linear algebra is, however, possible at any time, and is sufficiently familiar to one skilled in the art. The useful signal from detectors 36, 37 is normalized (and its dimensionality thus reduced by one dimension). Processing unit 46 is substantially a vector quantizer, a means/protocol that by way of a minimal correlation of the recorded measured data indicates a set of representations within the measured data which we will hereinafter call "code book vectors." Vector quantizers in general constitute the link between continuous vector distributions (in this case, intensities) and a discrete world of representations, and are existing art in communications and signal processing. Vector quantizers are used in particular for lossy transmission of vector signals (see e.g. Moon and Stirling, Mathematical methods and algorithm for signal processing. London: Prentice Hall, 2000). The vector quantizer used here has relatively few internal code book vectors —since a high level of compression of the measured data to a very simple model is performed with a great deal of loss—and is adaptive. The delivered intensity vectors are compared to all the code book vectors simultaneously, a subset of the most-similar code book vectors being selected and adapted. The degree of similarity and the subset are a degree of freedom of the method, and can vary. The selection is made somewhat more similar to the current delivered vector. In the simplest case, this is always merely the most-similar code book vector. This is achieved using mathematical methods such as distance measurements with vector norms, local aggregation, or recursive sliding averaging, but is embodied differently for different types of teachable vector quantizers.

A plurality of different methods are possible for an embodiment according to the present invention, and they have an extremely large number of degrees of freedom in the real embodiment. The configuration possibilities are sufficiently familiar to one skilled in the art and will be outlined briefly below.

In addition to the code book design method of classic cluster analysis (see Ripley, Pattern Recognition and Neural Networks, Cambridge: CUP, 1996), which is not directly practical here but which we nevertheless do not wish explicitly to exclude, biologically motivated neural networks are a particularly good choice. Luo and Unbehauen propose, inter alia, a class of competitive-learning neural architectures for the vector quantization task (Luo and Unbehauen, Applied Neural Networks for Signal Processing, Cambridge: CUP, 1997). Such methods derive from the simulation of representation-creating thought processes resulting from the competitive learning of individual neurons, and generate good representations even in the highly simplified information-processing model. More recent work, for example the dissertation of Bernd Fritzke (Bernd Fritzke, Vektorbasierte Neuronale Netze [Vector-based neural networks], Aachen: Shaker, 1998) contains an entire collection of different usable methods that achieve the goal in the context of this communication. The important differentiation criteria are the ways in which the code book vectors are adapted to the intensity distribution that is presented. This adaptation is referred to in the neural network literature as the "learning" process. The property essential for this invention, however, is representation creation, with the core idea of competition by different instances for presented stimuli, rather than a suitable mathematical method or a simulation-like approximation to biological processes. The concrete implementation of representation creation, as well as model details such as topologies between representations, retaining topology between the representation and intensity space, and learning and adaptation rules, are sufficiently familiar to one skilled in the art and are not specified further in the context of this invention. The most important of these competitive learning-based adaptation methods known to the inventor are outlined below and described in detail in the literature.

Direct simulation of competitive learning between neurons can result in an expression of the vector quantizer. For that purpose, a set of neurons is presented to the input vector; in addition, a lateral connection between the neurons is activated, having a weighting which reinforces local connections (positive connection) and inhibits more-distant ones (negative connection). The entire structure is exposed to a Hebb learning rule that reinforces correlations between inputs and outputs. This type of implementation may be found as an introductory conceptual model in almost all neural network textbooks (see Haykin, Neural Networks, New York: MacMaster University Press, 1994), and is only seldom used for real systems.

So-called "hard" competitive learning initializes the code book vectors randomly with values of sufficient probability. For each normalized intensity $\vec{i}$ delivered to the vector quantizer, a winner is determined from the set of code book vectors $\{\vec{\omega}_i\}$ according to a protocol $\vec{\omega}$=winner($\vec{i}$). To minimize errors, the Euclidean distance between stimulus $\vec{i}$ and code book $\{\vec{\omega}_i\}$ is usually used to determine the winner:

$$\vec{\omega} = \min(\|\vec{i} - \vec{\omega}_i\|).$$

That winner is adapted using the processing protocol $$\vec{\omega} = \vec{\omega} + \gamma(t)(\vec{i} - \vec{\omega}),$$

in which γ(t) is a learning rate that is often reduced over the operating duration of the vector quantizer. At a constant learning rate, the vector quantizer remains adaptive; if a learning rate inversely proportional to the number of wins is used, the result is the so-called "k means" method, which places itself exactly in the means of the distribution. Any desired intermediate states can be produced by selecting exponentially decreasing learning rates; or other variants can be applied.

In so-called "soft" competitive learning, not only the winners but also additional vectors, possibly even including all code book vectors, are adapted.

One expression is the so-called "neural gas" algorithm, in which a ranking of the winners on the basis of the winner functions, which is also performed in hard competitive learning methods, is carried out. Based on that ranking, an adaptation function calculates the degree of adaptation, the winner with the best rank being adapted more than a winner having a lower rank. The adaptation influence is often reduced over time. In a variant called "growing neural gas," an information-technology or error-minimization criterion is used to increase the number of vectors in the code book until adequate operation is ensured.

In the "self-organizing feature map" expression, a topology is overlaid on the code book vectors. During the learning process, a neighborhood around the winner is always adapted along with it: as a rule, closer neighbors are adapted more and more-distant neighbors less, and the influence of neighborhood learning is reduced over time. This is comparable to an X-dimensional rubber sheet that is creased and spread without tearing. The advantage of this method is that topological properties are retained.

More recent approaches are characterized by mixed forms in which topology retention by way of graphs overlaid on the vectors, as in the self-organizing feature map, is combined with growth criteria, as in the growing neural gas method. Examples include "growing cell structures" and the "growing grid."

In a setup of this kind, the adaptation method and the vectors in the code book are predefined upon initialization before the experiment. This can vary from one application to another. There are several variants in terms of loading the vector quantizer: a vector quantizer 58 that has exactly as many code book vectors as it has channels, which are preinitialized in the sequence of the channels with orthonormal unit vectors of the channel space; or a vector quantizer 58 that has an orthonormal unit vector for each channel and an oblique (diagonal in the signal space) unit vector for each possible mixed state. This variant functions in statistically more stable fashion when co-localizations occur. It can also be used to detect co-localizations, by adding a counter (not depicted) that counts how frequently each code book vector has been modified. The counter can be utilized for simple statistical significance tests, since the number of adaptation steps corresponds to the frequency of occurrence of the corresponding measured values. In processing unit 46, a matching of measured values and representations is performed in this fashion; we also call the representations "code book vectors," as is usual in the mathematical technical literature concerning vector quantizers. These code book vectors are read out of processing unit 46, as representations of local correlation traces, using an appropriate means. For processing, as indicated, the incoming normalized vectors (intensity vector $\vec{I}$) are compared to the code book vectors in order to continuously make the code book vectors slightly more similar to the incoming vectors, and to adapt the representations to the input distribution. This process is called representation creation, or simply "learning." In the preferred embodiment as depicted in FIG. 2, the measured intensities $I_1, I_2, \ldots, I_n$ are combined into an intensity vector $\vec{\omega}$. The intensities $I_1, I_2, \ldots, I_n$ are measured using the at least one detector that is associated with scanning microscope 100. A norm is calculated from intensity $\vec{I}$. In order to exclude image background, noise, and poorly expressed co-localizations, and to keep them from carrying through to the next calculation, only those intensity $\vec{I}$ whose magnitude is greater than a defined threshold value SW are considered. If the magnitude is too small, those intensity vectors $\vec{I}$ are rejected. Those intensity $\vec{I}$ that were not rejected are normalized, which is equivalent to projecting an n-dimensional problem onto the (n-1)-dimensional partial surface of the unit hypersphere in the positive quadrant, one position being sufficient to describe correlation traces in the original space. Another alternative is to use the mathematical trick of projecting onto the plane by way of the unit vectors, which represents a shortening or acceleration of the calculation but generates small and usually tolerable mathematical errors. In the depiction described in FIG. 4, one color is localized in each corner 56 of triangle 55. Red is in top corner 56a, green in left corner 56b, and blue in right corner 56c. In the example presented here, a projection onto the hyperplane is performed instead of the projection onto the unit sphere (otherwise a triangle with round edges would need to be drawn, corresponding to the development of the unit circle from the three-dimensional space into the plane). Although this generates small numerical errors, they are not important given the noise conditions, and a computational evaluation can be performed much more quickly.

Figure 5:
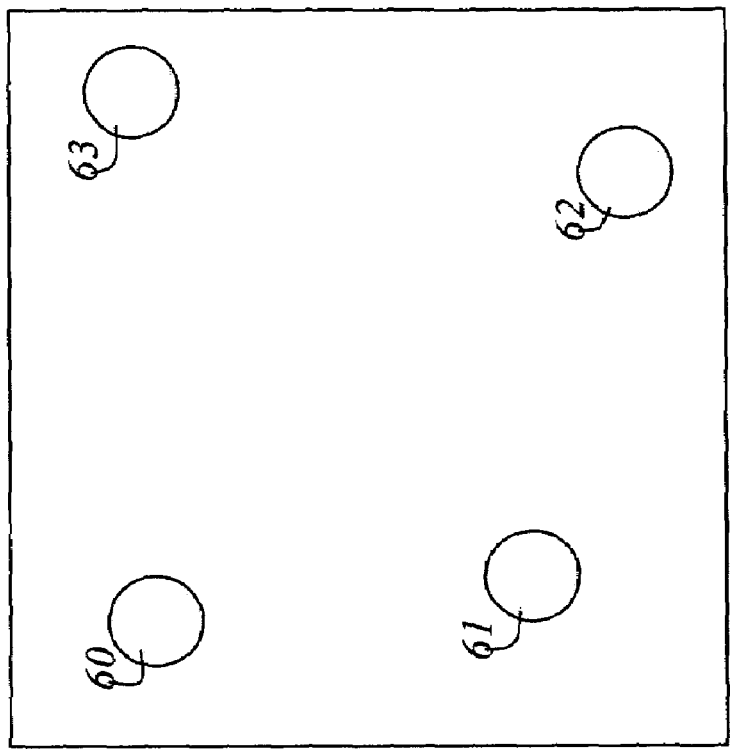
FIG. 5 shows an exemplary embodiment of four dye spectra, measured in a specimen, that are arranged in the vertices of a polygon in the hyperspace.
Figure 7:
FIG. 7 depicts the measured spectra of the dyes present in a sample.
Figure 6:
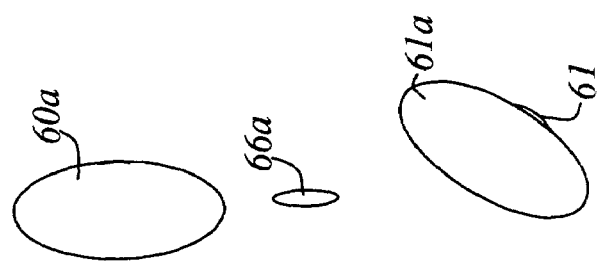
FIG. 6 depicts a polygon in the transformed hyperspace, having connecting lines on which potential mixed states of dye spectra are located.
Figure 6:
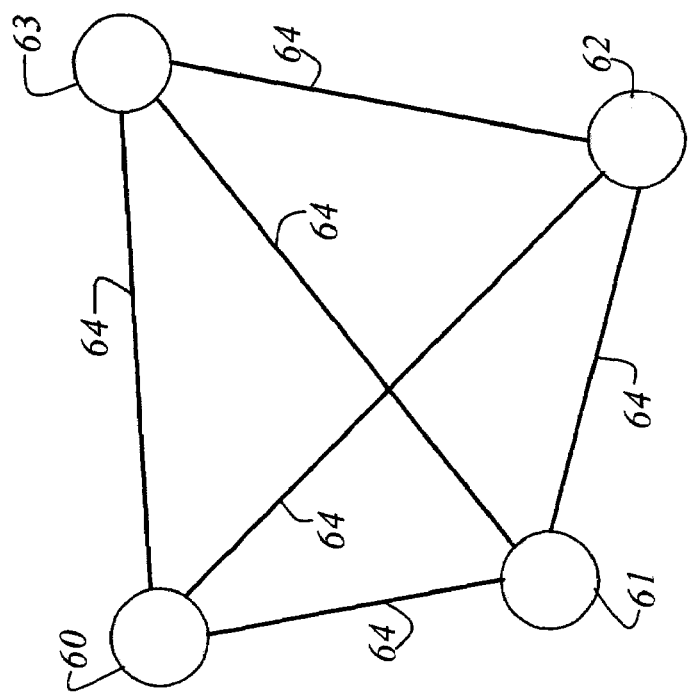

FIG. 5 shows four dye spectra measured in a specimen 15. A first dye spectrum 60, a second dye spectrum 61, a third dye spectrum 62, and fourth dye spectrum 63 form the vertices of a polygon in the projected hyperspace. A (P-1)-dimensional vector space can be generated using the transformation described above. In this vector space, the depiction can be described in idealized fashion in order to arrive at a protocol for identification of the dyes in the dyes contained in the sample to be examined. In FIG. 6, connections 64 on which potential mixed states can lie are drawn between the individual points of the polygon. FIG. 7 shows the superimposed point clouds of the measured spectra 60a, 61a, 62a, 63a, and 66a, the point clouds being depicted here by ellipses. A comparison of FIG. 6 and FIG. 7 indicates the principle of the proposed method: the pattern of point clouds must be congruent with the pattern determined theoretically from the reference spectra. From the congruence, or the deviations from congruence, conclusions can be generated regarding the dyes and their mixed states. For example, a comparison of point clouds 60a and 61a (FIG. 7) with reference positions 60 and 61 very strongly suggests the conclusion that 60a is dye 60 and 61a is dye 61. It can also be deduced, from the shape of point cloud 61a which approximates an ellipse, that there may be an interaction with other dyes, since an oblique main axis appears to have components of 60 and 63. The interpretation of this is, nevertheless, not clear. Point cloud 66a, however, can be unequivocally classified as a mixed state between 60 and 61, since the point cloud lies unequivocally on the connecting line between the dye spectra. We need the representation creation performed in processing unit 46 in order to be able to perform this kind of classification systematically.

Figure 8:
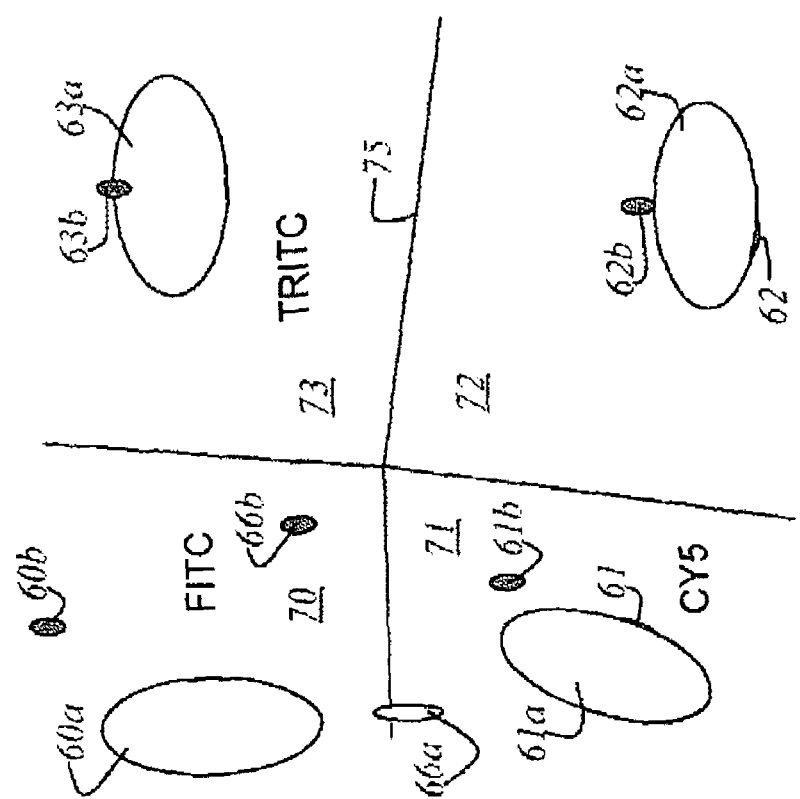
FIG. 8 shows a superimposition of L color spectra with the measured spectra in the hyperspace.

FIG. 8 schematically describes the use of the depiction from FIG. 7 to identify the dyes based on the five measured spectra 60a, 61a, 62a, 63a, and 66a. L dye spectra 60b, 61b, 62b, and 66b are stored with sufficient accuracy in a database of the memory of the computer system. This graphic illustrates in integrated fashion the explanation that was given above with reference to FIGS. 6 and 7. The transformation described above is applied to the spectral pixels of the five measured spectra 60a, 61a, 62a, 63a, and 66a and to all the discrete dye spectra 60b, 61b, 62b, 63b, and 66b of the database present in the database, after adaptation to the spectral scan grid. Lines 75 drawn in FIG. 8 characterize a first region 70, a second region 71, a third region 72, and a fourth region 73 in the hyperspace, which are allocated to a specific dye. These separating planes in the feature space (Voronoi tesselation) are obtained by simply applying a "nearest-neighbor" classification to each point of the feature space. One possible evaluation is obtained by pixel-by-pixel assignment of a spectrum to the pertinent surface which, together with a suitable color decoding, represents a dye map in the form of an image. The user can also be informed textually on display 27, or by voice output, as to which dyes are present in the sample.

Figure 9:
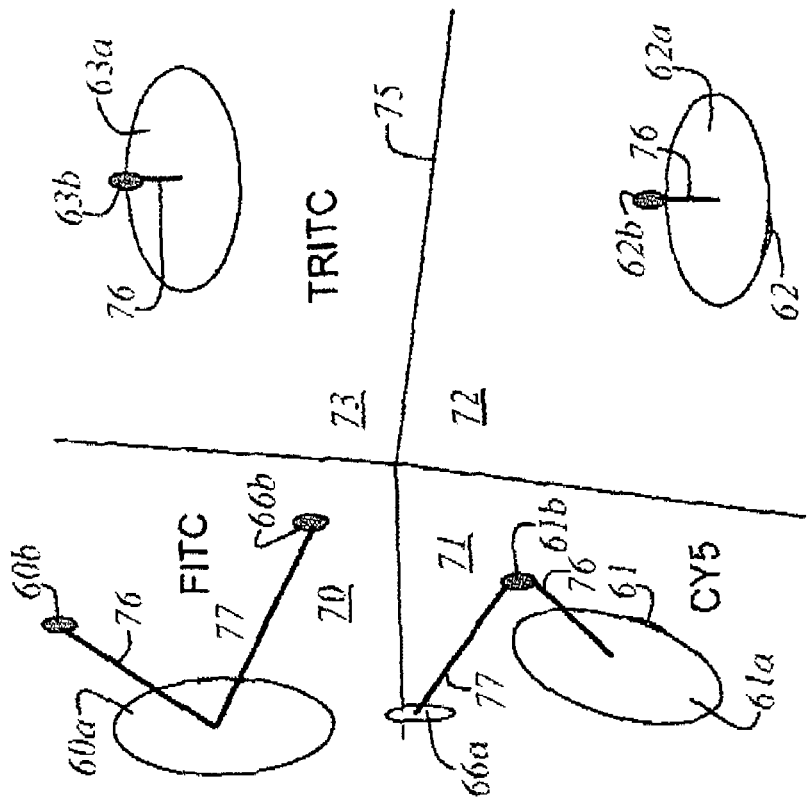
FIG. 9 schematically depicts the allocation of the L dye spectra to the measured spectra of the dyes based on the center points of the measured spectra.

FIG. 9 describes the possibility of ascertaining the dyes present in the specimen based on the measured spectra 60a, 61a, 62a, 63a, and 66a. This is done by determining centers 67 of the point clouds of the measured spectra. This is advantageously accomplished by vector quantization and representation creation. Allocation of the discrete dye spectra 60b, 61b, 62b, 63b, and 66b is performed in accordance with the minimum distance to the center of the point cloud. In FIG. 9, correct allocations are labeled with the reference character 76. Incorrect allocations are labeled with the reference character 77.

Figure 10:
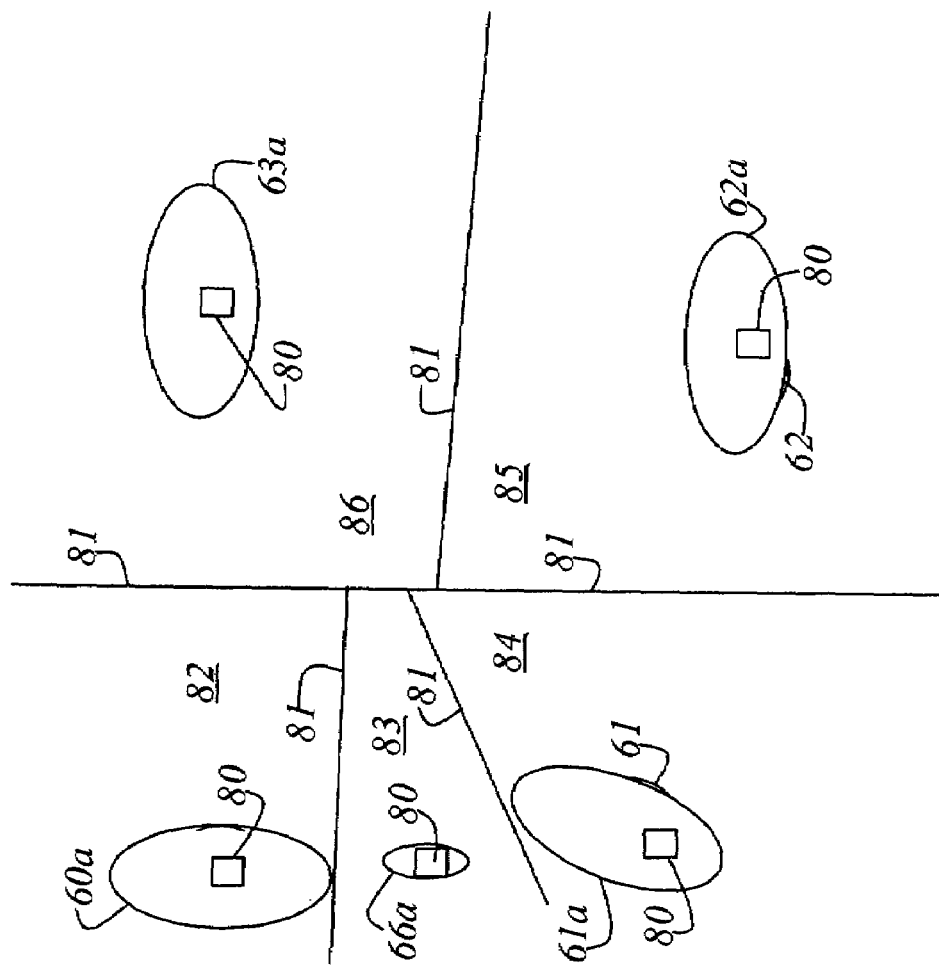
FIG. 10 shows another exemplary embodiment of the allocation of the L dyes to the measured spectra of the dyes present in a specimen.

FIG. 10 describes another possibility for allocating the discrete dye spectra to the measured spectra 60a, 61a, 62a, 63a, and 66a. This is done by determining a center point 80 for each point cloud of the measured spectra 60a, 61a, 62a, 63a, and 66a. This is advantageously accomplished by vector quantization and representation creation. Hyperplanes 81 in the hyperspace, as drawn in FIG. 10, are the assignment boundaries. These assignment boundaries are ascertained on the basis of the distances between the center points, yielding so-called subregions 82, 83, 84, 85, and 86 in the hyperspace. Individual point clouds in subregions 82, 83, 84, 85, and 86 are modeled as a multidimensional normal distribution N (s,V) with a covariance matrix. This can be implemented mathematically as a fit, but is accomplished in practice by direct calculation of the covariance matrix as an unbiased estimator. This essentially models the ellipses, shown in all the Figures, as point clouds. An eigenvalue analysis of the covariance matrix is performed. The eigenvalues and eigenvectors of the point clouds are collected and dye allocation is then performed, the center points being located as close as possible to the dye spectra. Since the eigenvectors of the covariance matrix have a pronounced direction when mixed and are not, as in the case of noise, expressed homogeneously, they can additionally be used to classify which mixed processes are taking place between dyes.

Figure 11:
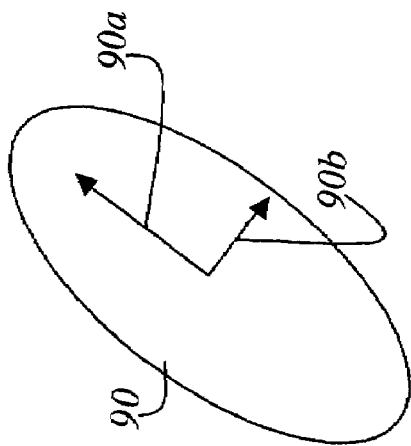
FIG. 11 depicts the eigenvalues on the basis of a point cloud of a measured spectrum.
Figure 12:
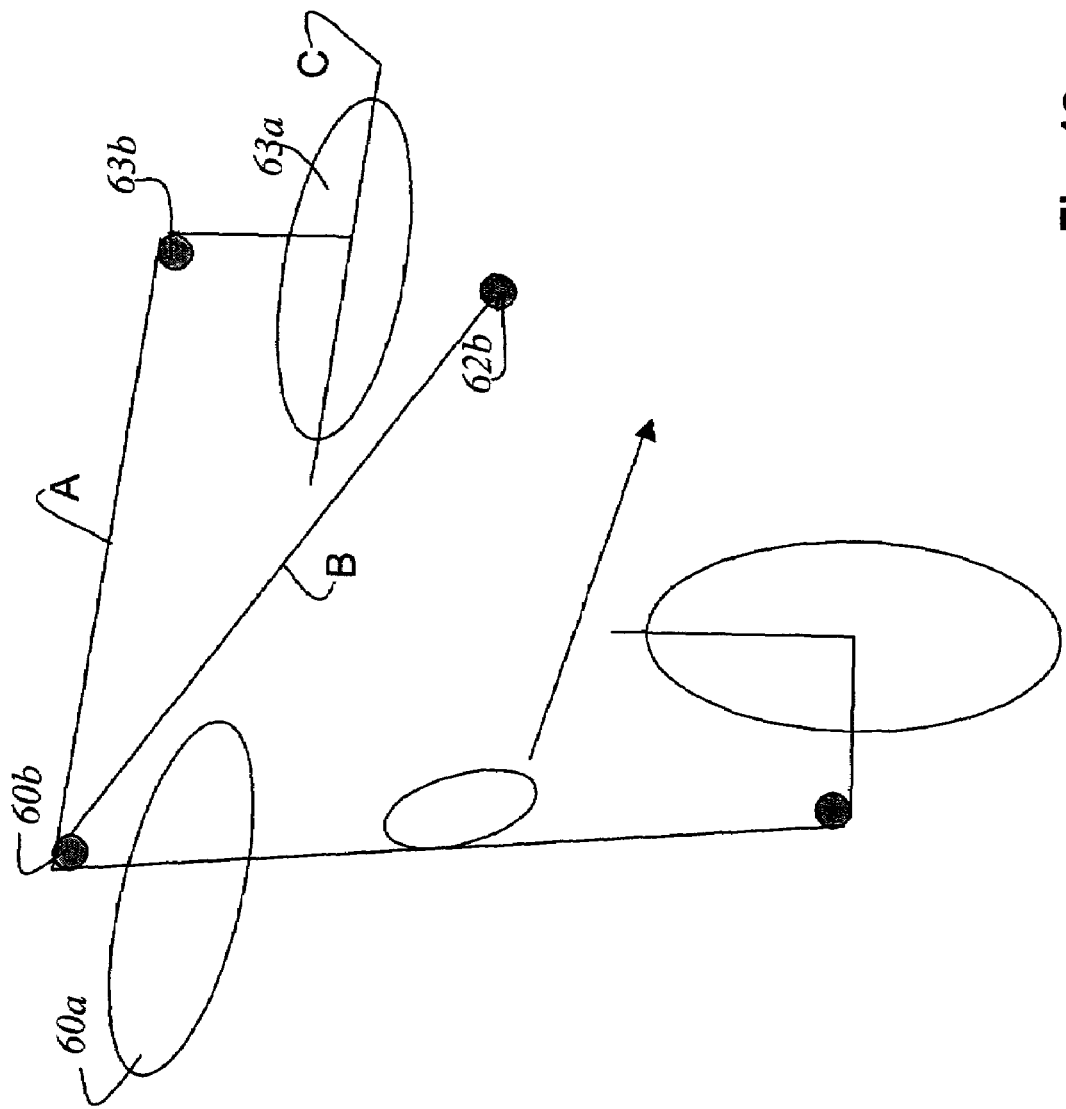
FIG. 12 shows the use of the eigenvectors to allocate the L dye spectra to the measured spectra.

FIG. 11 depicts eigenvectors 90a, 90b of a point cloud 90 of a measured spectrum. In FIG. 12, these eigenvectors are used to allocate the L dye spectra to the measured spectra. An unequivocal allocation is possible using these eigenvectors. In the example depicted, measured spectrum 63 lies undecidably between dyes 63b and 62b. By also considering the direction of the eigenvectors as a second-order statistic, it is possible to conclude that the direction thereby discovered (line C) is a more parallel fit to a mixture of 60b and 63b (line A) than to a mixture of 60b and 62b (line B). For that reason it is probably more likely to be dye 63b, and the alternative (62b) is eliminated. This type of statement is not possible with the presently known existing art.

After the dye concentration has been ascertained, it is possible to calculate back to the intensity bases, calculate a pseudoinverse, and correct the measured values. These applications are referred to in the existing art in astronomy and microscopy as "linear unmixing."

The invention claimed is:

1. A microscope system for the analysis and evaluation of multiple colorings in a microscopic specimen, comprising:
   a scanning microscope that defines an illuminating light beam and a detected light beam;
   an SP module that is arranged in the detected light beam in front of at least one detector; and a computer system with a memory, wherein a database is provided in which discrete dye spectra are stored:
   the computer system encompasses a software program that performs a transformation of the data of the ascertained spectra and a transformation of the dye spectra stored in the database; and
   the software program allocates the transformed dye spectra to measured spectra, in which context a comparison can be performed,
   wherein the comparison is accomplished by way of a distance dimension in a projection space.

2. The microscope system as defined in claim 1, wherein the comparison is accomplished by way of a distance and an orientation of local clusters in the projection space.

3. The microscope system as defined in claim 1, wherein the transformed data can be presented on a display.

4. A method for the analysis and evaluation of multiple colorings in a microscopic specimen using a scanning microscope, comprising the following steps:
   a) recording spectra of dyes present in the specimen using an SP module, and ascertaining the electrical signals representing the spectra;
   b) performing a transformation of the data of the ascertained spectra, performing the transformation of the dye spectra stored in a database;
   c) dividing a transformation space into regions, each of which is allocated to a certain dye; and
   d) allocating the dye spectra to measured spectra by way of a comparison in the transformation space,
   wherein the comparison of the ascertained spectra to reference spectra is accomplished on the basis of a distance dimension.

5. The method as defined in claim 4, wherein the comparison of the ascertained spectra to the reference spectra is accomplished on the basis of a distance dimension and directions of the eigenvectors of the covariance matrix.

6. The method as defined in claim 4, wherein the allocation of the dye spectra to the measured spectra is accomplished on the basis of a "nearest neighbor" method in the transformation space.

* * * * *